United States Patent [19]

Smith

[11] Patent Number: 4,737,028

[45] Date of Patent: Apr. 12, 1988

[54] TARGET LOOP ACTIVE BORESIGHTING DEVICE

[75] Inventor: Kenneth R. Smith, Houston, Ala.

[73] Assignee: The United States of America as represented by the Secretary of the Army, Washington, D.C.

[21] Appl. No.: 848,863

[22] Filed: Apr. 7, 1986

[51] Int. Cl.[4] ............................................. G01B 11/26
[52] U.S. Cl. .................................. 356/152; 244/3.13; 250/339; 250/342; 358/113
[58] Field of Search .................. 356/152, 5; 244/3.16, 244/3.12, 3.13; 250/332, 339, 342; 358/113, 108

[56] References Cited

U.S. PATENT DOCUMENTS

| | | | |
|---|---|---|---|
| 3,149,231 | 9/1964 | Ravich | 250/342 |
| 3,644,043 | 2/1972 | Jones et al. | 356/152 X |
| 3,751,166 | 8/1973 | Starkey et al. | 356/152 X |
| 3,953,667 | 4/1976 | Layton et al. | 358/113 |
| 4,091,412 | 5/1978 | Salonimer | 358/113 X |
| 4,107,529 | 8/1978 | Chicklis et al. | 244/3.16 X |
| 4,155,096 | 5/1979 | Thomas et al. | 244/3.13 X |
| 4,298,280 | 11/1981 | Harney | 250/342 X |
| 4,324,491 | 4/1982 | Hueber | 244/3.13 X |
| 4,349,838 | 9/1982 | Daniel | 244/3.13 X |
| 4,407,464 | 10/1983 | Linick | 244/3.13 |
| 4,497,065 | 1/1985 | Tisdale et al. | 356/152 X |
| 4,561,775 | 12/1985 | Patrick et al. | 250/332 X |
| 4,600,305 | 7/1986 | Priddy | 356/152 |

Primary Examiner—Stephen C. Buczinski
Assistant Examiner—Linda J. Wallace
Attorney, Agent, or Firm—Freddie M. Bush; Robert C. Sims

[57] ABSTRACT

The invention disclosed here is a sensor comprised of a laser designator, a band block filter and a two-dimensional sensor that can "see" the target in one band and the designator in another band, thereby giving a single sensor dual band system—something not offered by any sensor/designator operating in the wavelength band intrinsically inherent to this sensor technology. The sensor is a two-dimensional starring array constructed from Schottky Barrier Diodes utilizing a platinum silicide sensing layer. This construct normally exhibits a spectral response from around 1 micron to around 6 microns. The sensor has been proposed as a passive thermal imager in the 3–5 micron band because of its responsivity (Quantum Efficiency) is maximum in the 3–5 micron band. Typically, transmission windows for these sensors are designed to block off the solar radiation from the visible out to the 3 micron region to prevent saturation of the sensor in the daytime. This invention proposes to remove the filter and replace it with a band block filter that cuts out the 2–3 micron solar radiation and leaves the 1–2 micron region transmissive, as well as the 3–5 micron atmospheric window.

1 Claim, 2 Drawing Sheets

TARGET LOOP ACTIVE BORESIGHTING DEVICE

DEDICATORY CLAUSE

The invention described herein may be manufactured, used, and licensed by or for the Government of governmental purposes without the payment to me of any royalties thereon.

BACKGROUND OF THE INVENTION

For over a decade, the Precision Guided Munitions (PGM's) and other Electro-Optical Guided Munitions (EOGM's) have been plagued by the age-old problem of establishment and maintenance of boresight in addition to the stabilization of the line of sight in turbulent atmospheres, vibrating environments, and lightweight optical structures, especially in the cases where laser designators are utilized to define the aimpoint at the target plane. In principle, the concept of laser designation is well based in a theoretical and experimental sense; however, the reliable reduction to practical applications in the Army is continually plagued by the boresight and stabilization problem.

This patent disclosure offers a solution to this problem by describing a general concept of Target Loop Active Boresighting (TLAB) applicable to many systems, and offers a unique sensor/laser designator/filter construct that solves the boresight and line of sight stabilization problem. This concept contains numerous unique advantages that have never before been possible until the invention of this sensor system to be described under the sensor/designator/filter section of this disclosure.

Prior to the invention disclosure, it is appropriate to describe the concept of Target Loop Active Boresight (TLAB) to lay the groundwork for an understanding of the sensor/designator/filter combination. In any PGM or EOGM, the operating premise is one in which the target, its aimpoint, the laser designator, the guidance package of the PGM, and the flight trajectory of the PGM must all attain closure at the target's aimpoint. The principle is simple but existing systems are rendered less than highly reliable because of one missing item; i.e., the night viewer or forward looking infrared (FLIR) cannot establish target plane closure of the aimpoint and the designator because it cannot "see" the target and the designator on a single sensor. Therefore, if the sensor and the laser designator are out of alignment, the operator will direct the PGM to the wrong location. This disclosure describes an invention that eliminates these problems and, therefore, provides the solution to the implementation of a complete TLAB system, meanwhile offering simplicity and economy over existing systems that are plagued with the boresight problem because they cannot "see" all necessary target parameters in a single sensor.

SUMMARY OF THE INVENTION

The invention disclosed here is a sensor comprised of a laser designator, a band block filter and a two-dimensional sensor that can "see" the target in one band and the designator in another band, thereby giving a single sensor dual band operational capabilities.

The sensor is a two-dimensional starring array constructed from Schottky Barrier Diodes utilizing a platinum silicide sensing layer. This construct normally exhibits a spectral response from around 1 micron to around 6 microns. The sensor has been proposed as a passive thermal imager in the 3-5 micron band because of its responsivity (Quantum Efficiency) is maximum in the 3-5 micron band. Typically, transmission windows for these sensors are designed to block off the solar radiation from the visible out to the 3 micron region to prevent saturation of the sensor in the daytime. This invention proposes to remove the filter and replace it with a band block filter that cuts out the 2-3 micron solar radiation and leaves the 1-2 micron region transmissive, as well as the 3-5 micron atmospheric window.

DETAILED DESCRIPTION OF THE BEST MODE AND PREFERRED EMBODIMENT

The invention disclosd here in the figures is a sensor comprised of a laser designator 1, a focusing lens 9, a two-dimensional sensor 2 and a band block "solar" filter 3. The sensor can "see" the target in one band and the designator in another band, thereby giving a single sensor dual band system—something not offered by any sensor/dsignator operating in the wavelength band intrinsically inherent to this sensor technology.

The sensor 2 is a Schottky two-dimensional mosaic array (dual band sensitivity) constructed from Schottky Barrier Diodes utilizing a platinum silicide sensing layer. This construct normally exhibits a spectral response from around 1 micron to around 6 microns. The sensor 2 is a passive thermal imager in the 3-5 micron band because of its responsivity (Quantum Efficiency) is maximum in the 3-5 micron band. Typically, transmission windows for these sensors are designed to block off the solar radiation from the visible out to the 3 micron region to prevent saturation of the sensor in the daytime. This invention removes this filter and replaces it with a band block "solar" filter 3 that cuts out the 2-3 micron solar radiation and leaves the 1-2 micron region transmissive, as well as the 3-5 micron atmospheric window.

Figure 2:
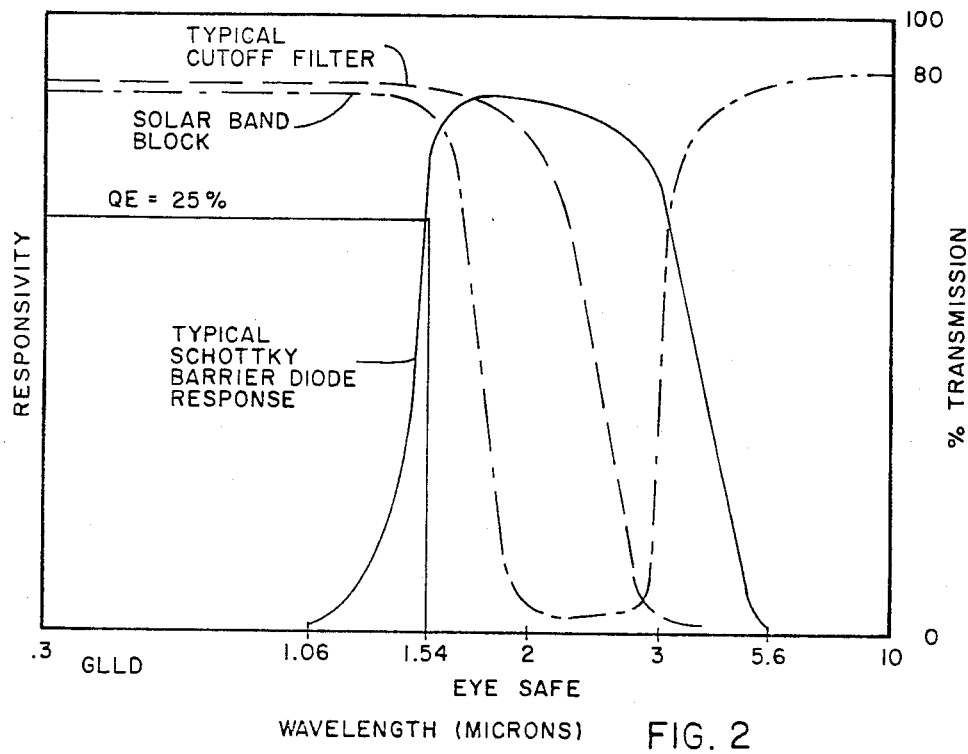
FIG. 2 shows typical plots of the various elements used in FIG. 1.

As the Schottky Barrier Diode array 2 has some response at the 1 micron level, a short wavelength NdYg laser is used as the designator 1, as it is expected that the designator beam 10 reflected from "target" will be visible on the array 2, thereby solving the boresight problem (see FIG. 2 for typical plots). This invention also utilizes a stokes shifted 1.06 micron NdYg laser operating with an eye-safe 1.54 micron radiation as the next generation designator. The Schottky Barrier Diode Array 2 possesses quantum efficiency nearly equal to the maximum attained throughout the spectral response band of the sensor and, therefore, represents a more responsive system without giving up significantly on designated spot size due to a larger diffraction spot size at the somewhat longer wavelength.

In order to attain the broad band operation from 1 micron to 6 microns, it is necessary to put in a window on the sensor 2 that will pass the broad band radiation. This can easily be accomplished by using something like silicon optics without the typical multicoated sapphire used to block IR transmission out to about 3 microns. Then, in order to be able to operate in direct sunlight, a band block filter could be installed that would block out the 2-3 micron band. This filter could be built and permanently installed, but transmission losses may significantly affect night operation until high transmission (>80%) band block filters can be developed. This changing of filters poses no technical problem, but does give some undesirable operational characteristics that could be best overcome with good band block optics.

Finally the invention possesses all the required parameters and degrees of freedom for either manual or automatic boresight alignment, as well as automatic designator stabilization through the medium of control of a steering mirror 11 in the optical path of the designator beam 10. A Schottky array processing electronic device 11 is connected to sensor 2 so as to simultaneously provide a visual picture on TV screen 12 of the target 20 and a visual showing of the spot 21 that the laser beam 10 illuminates on the target. With this information, the operator will steer the camera unit 100 and steering mirror 30 so as to maintain the spot 21 at the center of the target. (Not necessarily keeping the target 20 in the center of the overall displayed image.)

The unique features of this invention disclose:

1. Simultaneous dual band operation in the near- and mid-infrared range on a single sensor.
2. Simultaneous operation of passive and active infrared signatures on a single sensor.
3. Total boresight correction at the target plane.
4. 3-5 micron passive thermal imaging with 1.06 or 1.54 micron tag beam designator.
5. Unique time synchronized separation of passive signature from the active signature, if desired or required.
6. Relaxation of critical structural alignment tolerances.

OPERATING PRINCIPLE

Figure 1:
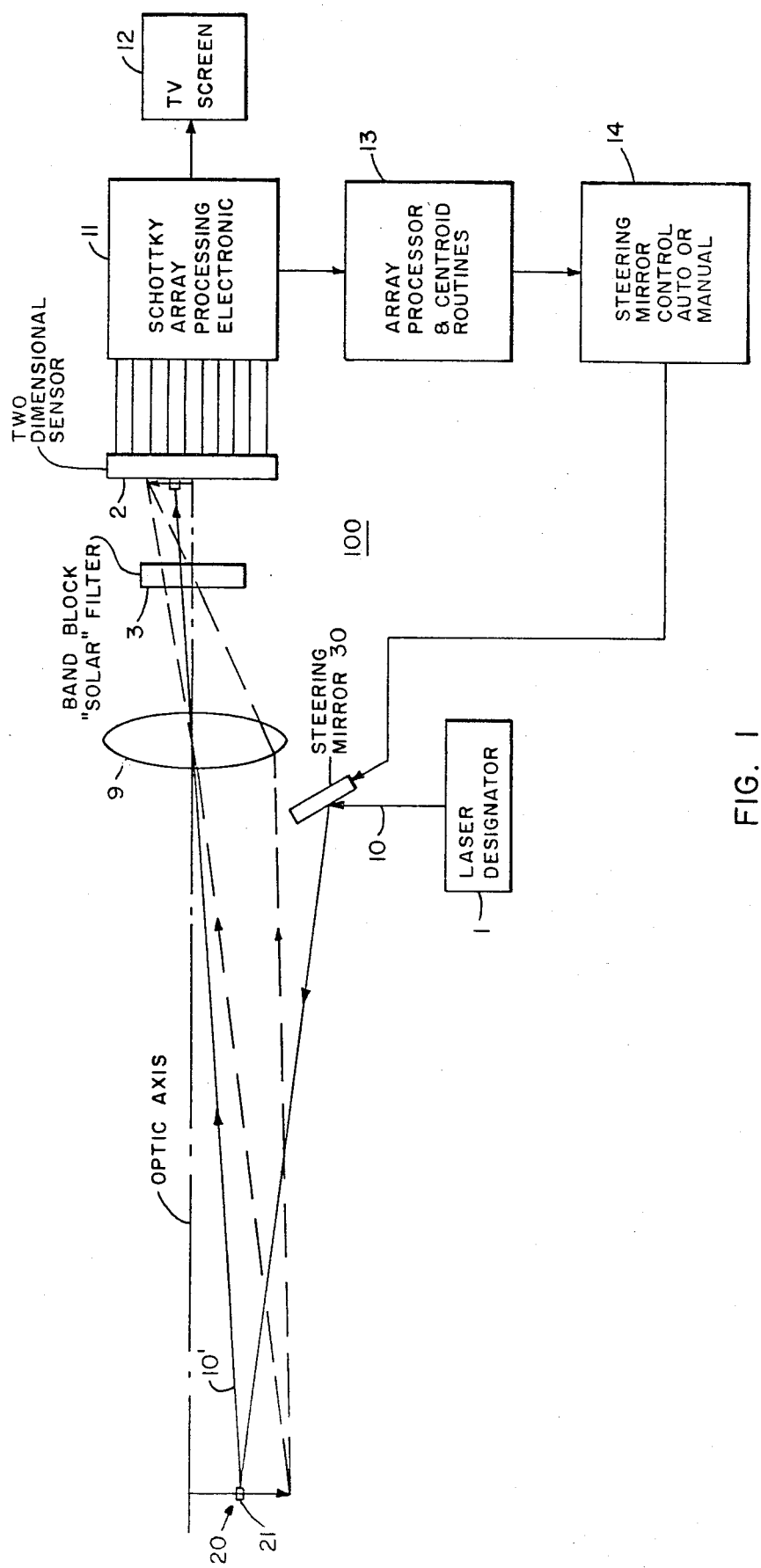
FIG. 1 is a schematic illustration of the present invention.
Figure 3:
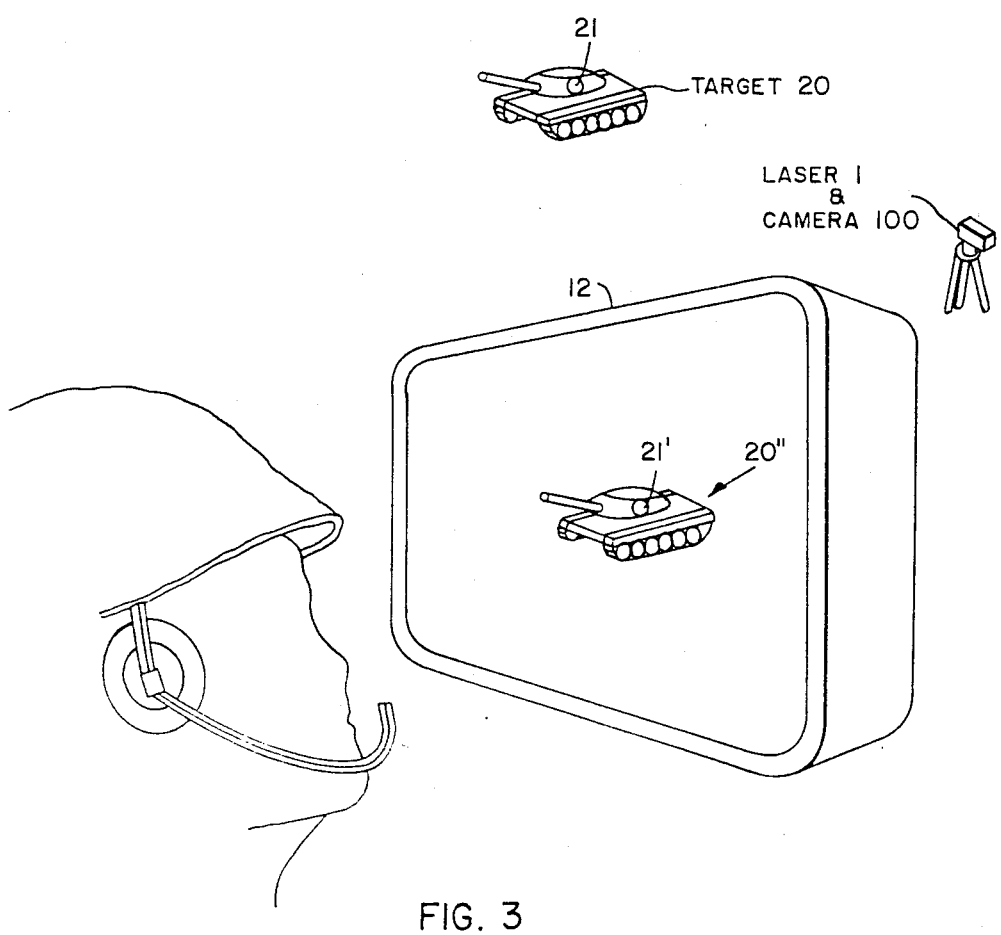
FIG. 3 is a pictoral showing of the invention.

The operating principle is best described with reference to FIGS. 1 and 3 which contain a thermal imaging camera 100 with the two-dimensional Schottky Diode imaging array 2 therein, a laser being used to designate the target aim point 21 for a missile or the like (not shown), a target 20 (a tank in this case) which is in the mountain terrain, and an operator (could be an automatic control system) who serves as the control system. The operator views the passive thermal image of the tank on a standard video (TV) screen 12 and performs the tracking function by positioning the thermal imaging camera 100. The operator then positions the designator laser 1 on the appropriate aim point on the tank. As the Schottky array 2 possesses the unique capability to respond to the designator laser wavelength, the laser spot also appears on the TV screen providing the operator with boresight information. With very simple mechanical alignment of the laser and the thermal imaging camera, the designator laser spot will fall somewhere on or near the target. Upon operator visualization of the designator on the target, the operator adjusts out the boresight and aim point designation errors by observing the TV image of the target, thereby giving the terminology "Target Loop Active Boresight."

The thermal and laser returns can be processed by an array processor and centroid routines device 13 which detects the outline of the target and sends a control signal to the steering mirror control device 14 so as to center the laser spot on a predetermined aim point. Any of the well known devices can be used to carry out these tracking functions.

I claim:

1. A method of positioning a laser spot on a target comprising the steps of illuminating a laser spot on said target, using a detector to detect radiation returns of both said laser spot and a thermal image of said target, positioning said spot onto the thermal image of the target to a predetermined aim point, producing and maintaining the detection of a visual image of the thermal image of the target upon a video imaging device, and steering a laser designator so that said laser spot will be directed towards said aim point on said target, while using a band block "solar" filter between said target and said detector so as to block out radiation in the 2 to 3 micron band, using a Schottky Barrier Diode array as said detector to sense both the frequency of the radiation of said laser designator and the frequency of the thermal radiation of said target, and using said Schottky Diode for simultaneous dual band operation in the near- and mid- infrared range thereby providing simultaneous derivation of passive and active infrared signatures on said imaging device.

* * * * *